United States Patent
Andres Del Valle

(10) Patent No.: US 8,597,121 B2
(45) Date of Patent: Dec. 3, 2013

(54) MODIFICATION OF AVATAR ATTRIBUTES FOR USE IN A GAMING SYSTEM VIA A MODERATOR INTERFACE

(75) Inventor: Ana Cristina Andres Del Valle, Juan les Pins (FR)

(73) Assignee: Accenture Global Services Limited, Dublin (IE)

( * ) Notice: Subject to any disclaimer, the term of this patent is extended or adjusted under 35 U.S.C. 154(b) by 401 days.

(21) Appl. No.: 12/495,175

(22) Filed: Jun. 30, 2009

(65) Prior Publication Data

US 2009/0325701 A1 Dec. 31, 2009

(30) Foreign Application Priority Data

Jun. 30, 2008 (WO) ................. PCT/EP2008/058389

(51) Int. Cl.
*A63F 13/00* (2006.01)
*A63F 13/02* (2006.01)
*A63F 13/10* (2006.01)

(52) U.S. Cl.
USPC ............................................ 463/36; 715/706

(58) Field of Classification Search
USPC ............................................ 463/36; 715/706
See application file for complete search history.

(56) References Cited

U.S. PATENT DOCUMENTS

| | | | |
|---|---|---|---|
| 6,039,688 A * | 3/2000 | Douglas et al. ............... | 600/300 |
| 6,585,622 B1 | 7/2003 | Shum | |
| 6,817,979 B2 * | 11/2004 | Nihtila .......................... | 600/300 |
| 7,091,976 B1 * | 8/2006 | Ostermann et al. ........... | 345/473 |
| 7,128,577 B2 * | 10/2006 | Renaud ......................... | 434/236 |
| 7,379,066 B1 * | 5/2008 | Ostermann et al. ........... | 345/473 |
| 7,609,270 B2 * | 10/2009 | Ostermann et al. ........... | 345/473 |
| 7,671,861 B1 * | 3/2010 | Ostermann et al. ........... | 345/473 |
| 7,765,111 B2 * | 7/2010 | Brown ............................. | 705/2 |
| 7,792,379 B2 * | 9/2010 | Andres del Valle ........... | 382/254 |
| 7,953,294 B2 * | 5/2011 | Andres del Valle ........... | 382/291 |
| 8,014,589 B2 * | 9/2011 | Andres Del Valle .......... | 382/154 |
| 8,033,996 B2 * | 10/2011 | Behar ............................ | 600/300 |
| 8,140,340 B2 * | 3/2012 | Bhogal et al. ................. | 704/273 |
| 8,221,290 B2 * | 7/2012 | Vincent et al. .................... | 482/8 |
| 2003/0206170 A1 * | 11/2003 | Bickmore et al. ............. | 345/473 |
| 2004/0002634 A1 * | 1/2004 | Nihtila .......................... | 600/300 |
| 2005/0101845 A1 * | 5/2005 | Nihtila .......................... | 600/300 |

(Continued)

FOREIGN PATENT DOCUMENTS

WO 2008/061023 A 5/2008

OTHER PUBLICATIONS

Search Report mailed Sep. 12, 2008 in PCT/EP2008/058389.

(Continued)

*Primary Examiner* — William H McCulloch, Jr.
(74) *Attorney, Agent, or Firm* — Harrity & Harrity, LLP

(57) ABSTRACT

A gaming system comprises a gaming platform adapted to run a computer game in which an avatar is associated with a player of the game; a memory arranged to store one or more attributes associated with said avatar, said attributes affecting at least the appearance of the avatar in the game; a first input port adapted to receive an input of the player for controlling the progression of the avatar in the game; and a second input port adapted to receive an input of a moderator indicating a modification to be applied to one or more of the avatars attributes stored in said memory, wherein the gaming platform is adapted to display to the player an indication of modified attributes.

22 Claims, 1 Drawing Sheet

(56) References Cited

U.S. PATENT DOCUMENTS

| | | | |
|---|---|---|---|
| 2005/0137015 A1* | 6/2005 | Rogers et al. | 463/42 |
| 2005/0206610 A1* | 9/2005 | Cordelli | 345/156 |
| 2005/0216529 A1* | 9/2005 | Ashtekar et al. | 707/203 |
| 2005/0227811 A1 | 10/2005 | Shum | |
| 2006/0089543 A1* | 4/2006 | Kim et al. | 600/300 |
| 2006/0143569 A1* | 6/2006 | Kinsella et al. | 715/752 |
| 2006/0210045 A1* | 9/2006 | Valliath et al. | 379/202.01 |
| 2006/0256132 A1* | 11/2006 | Shin et al. | 345/619 |
| 2006/0262120 A1* | 11/2006 | Rosenberg | 345/473 |
| 2007/0050715 A1* | 3/2007 | Behar | 715/706 |
| 2008/0146334 A1* | 6/2008 | Kil | 463/36 |
| 2008/0174795 A1* | 7/2008 | Andres Del Valle | 358/1.9 |
| 2008/0175517 A1* | 7/2008 | Andres del Valle | 382/293 |
| 2008/0187246 A1* | 8/2008 | Andres Del Valle | 382/302 |
| 2008/0201442 A1* | 8/2008 | Ostermann et al. | 709/206 |
| 2008/0268418 A1* | 10/2008 | Tashner et al. | 434/365 |
| 2009/0029769 A1* | 1/2009 | Muller | 463/31 |
| 2009/0047645 A1* | 2/2009 | Dibenedetto et al. | 434/258 |
| 2009/0048044 A1* | 2/2009 | Oleson et al. | 473/570 |
| 2009/0048070 A1* | 2/2009 | Vincent et al. | 482/8 |
| 2009/0309891 A1* | 12/2009 | Karkanias et al. | 345/581 |
| 2009/0325701 A1* | 12/2009 | Andres Del Valle | 463/36 |
| 2010/0042697 A1* | 2/2010 | Ostermann et al. | 709/206 |
| 2011/0064331 A1* | 3/2011 | Andres del Valle | 382/308 |
| 2011/0157175 A1* | 6/2011 | Andres del Valle | 345/419 |
| 2012/0254749 A1* | 10/2012 | Downs et al. | 715/706 |

OTHER PUBLICATIONS www.gamegate2k.com "Wow GM (Game Master) Commands", Internet citation, Nov. 24, 2004, XP002480773.

* cited by examiner

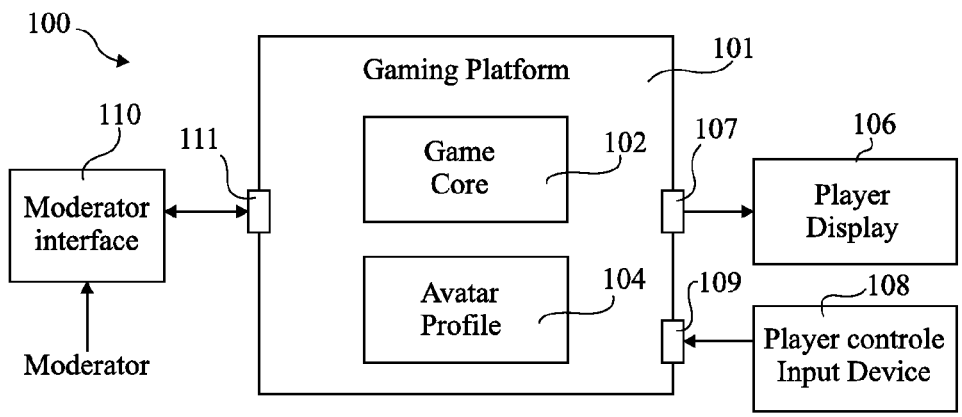
Fig 1
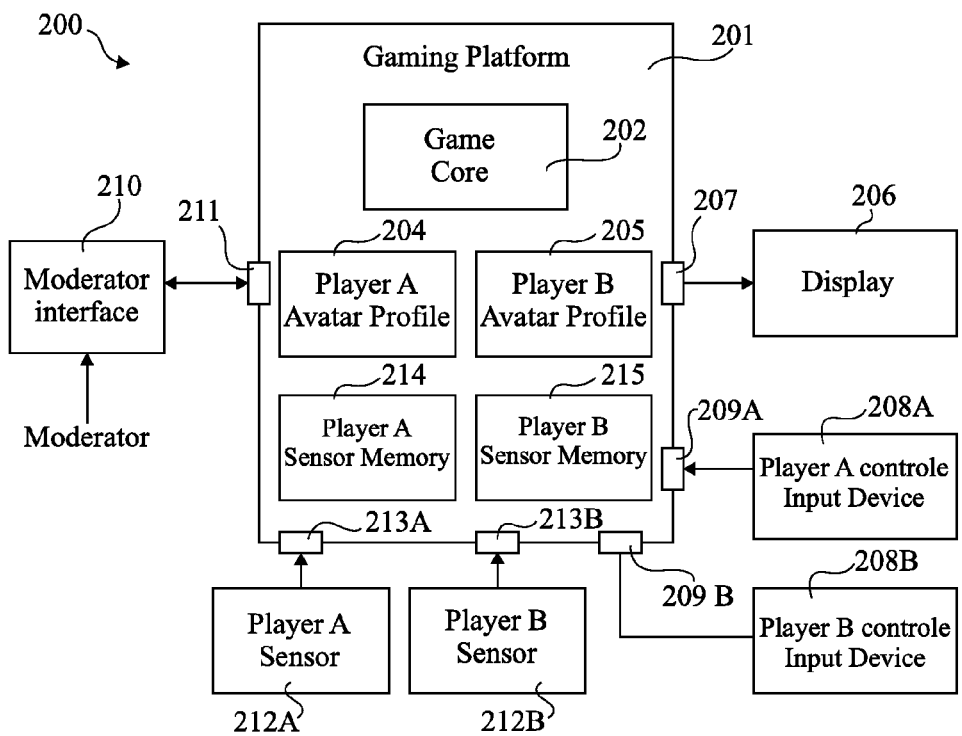
Fig 2
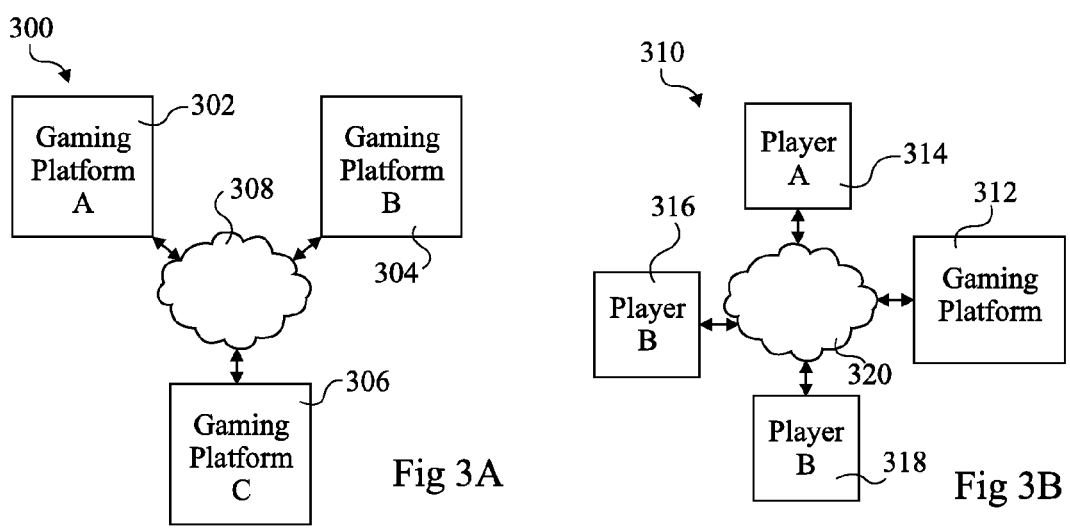
Fig 3A
Fig 3B

MODIFICATION OF AVATAR ATTRIBUTES FOR USE IN A GAMING SYSTEM VIA A MODERATOR INTERFACE

FIELD OF THE INVENTION

The present invention relates to a gaming system and a method of controlling a game, and in particular to a gaming system and method involving an avatar.

BACKGROUND TO THE INVENTION

Computing games, such as games played on a PC or on a games console, often involve avatars. Avatars represent the player in a game, and are often designed to the taste of the player. The avatar may be more or less anthropomorphic, thereby increasing the level of involvement and identification the player has with his/her virtual representation in the game. The appearance and performance of the avatar in the game may evolve during the game, for example if the avatar loses health, picks up objects, gains strength etc.

In such games, it is generally an objective to make the player feel as part of the gaming world as possible. The control of the avatar in a game is usually achieved by the player using a handheld input device, such as a control pad, and some gaming consoles also come equipped with other inputs such as foot pedals, which can to some extent match actions in the real world performed by a player to actions of the avatar in the game, and thereby improve the playing experience.

However, there exists a technical problem in improving the interaction between the player's environment and the game environment. In particular, computer games generally do not encourage a great deal of physical activity, and the player's health can become an issue.

SUMMARY OF THE INVENTION

It is an aim of embodiments of the present invention to at least partially address one or more problems in the prior art.

According to one aspect of the present invention, there is provided a gaming system comprising a gaming platform adapted to run a computer game in which an avatar is associated with a player of the game; a memory arranged to store one or more attributes associated with said avatar, said attributes affecting at least one of: the performance of the avatar in the game; and the appearance of the avatar in the game; a first input port adapted to receive an input of the player for controlling the progression of the avatar in the game; and a second input port adapted to receive an input of a moderator indicating a modification to be applied to one or more of the avatars attributes stored in said memory, wherein the gaming platform is adapted to display to the player an indication of modified attributes.

According to one embodiment of the present invention, the attributes determine the appearance of said avatar in the game, and wherein said gaming platform is adapted to display changes to the avatar's appearance after said attributes are modified.

According to another embodiment of the present invention, the gaming system comprises a sensor input port adapted to receive sensor data relating to the player, and a memory adapted to store said sensor data.

According to another embodiment of the present invention, the second input port is adapted to provide access to said sensor data, and wherein said modifications to said attributes are based on said sensor data.

According to another embodiment of the present invention, the gaming system comprises a moderator interface coupled to said second input port and adapted to automatically generate at least one data value for modifying one or more of said avatar attributes.

According to another embodiment of the present invention, the gaming platform supports a plurality of players, each player being associated with an avatar in the game, said memory storing attributes associated with each avatar, wherein said a second input port is adapted to receive inputs for modifying one or attributes of each avatar stored in said memory, and wherein the gaming platform is adapted to display to each player an indication of the modified attributes.

According to another embodiment of the present invention, the gaming platform and memory are part of a games console and said first and second input ports are connected to said games console.

According to another embodiment of the present invention, the gaming platform is part of a server, and wherein said first and second input ports are remote ports coupled to said server via a network.

According to another embodiment of the present invention, the gaming platform is a mobile device.

According to another aspect of the present invention, there is provided a method of controlling the progression of a game involving at least one avatar associated with at least one player, comprising controlling the progression of the avatar in the game based on an input of said player; receiving at least one moderator input modifying one or more attributes of said avatar stored in a memory; and modifying the performance of said avatar based on the modification of said one or more attributes and displaying said modification to said player. In accordance with this aspect of the present invention, the progression of the avatar in said game based on said input of said player may be controlled by a gaming platform as described herein; the at least one moderator input modifying said one or more attributes of said avatar stored in said memory may be received via at least one input port of said gaming platform; and the performance of said avatar based on the modification of said one or more attributes may be modified via said gaming platform and said modification displayed to said player via a display associated with said gaming platform.

According to another embodiment of the present invention, the moderator is a health expert, and wherein said one or more attributes are modified based on one or more lifestyle variables relating to health of said player.

According to another embodiment of the present invention, the one or more lifestyle variables comprise one or more of the weight of said player; the blood pressure of said player; the blood sugar level of said player; the heart rate of said player; the lung capacity of said player; and the muscle/fat ratio of said player.

According to another embodiment of the present invention, the method further comprises measuring by at least one sensor one or more of said lifestyle variables, and providing said moderator with access to data measured by said at least one sensor.

According to another embodiment of the present invention, there is a plurality of avatars in said game, each associated with one of a plurality of players, the method comprising receiving at least one moderator input modifying attributes of each of said plurality of avatars stored in said memory. In accordance with this embodiment of the present invention, said at least one moderator input modifying attributes of each of said plurality of avatars stored in said memory may be received via said at least one input port of the gaming platform.

According to another embodiment of the present invention, the method comprises changing the visual appearance of said avatar based on a modification to one or more of said attributes by said moderator.

According to another embodiment of the present invention, the speed of said avatar in said game is modified by said moderator based on the physical condition of said player.

According to another aspect of the present invention, there is provided a storage medium storing a computer game arranged to implement the above method steps when executed by a processor.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIGS. 1, 2, 3A and 3B illustrate gaming systems according to embodiments of the present invention.

DETAILED DESCRIPTION OF EMBODIMENTS OF THE INVENTION

FIG. 1 illustrates a gaming system 100 comprising a gaming platform 101. The gaming platform 101 comprises a game core 102, and an avatar profile 104. Coupled to the gaming platform, either directly or via a network such as the Internet (not shown), is a player display 106 coupled via an output port 107 of the gaming platform, and a player control input device 108 coupled via an input port 109 of the gaming platform. A moderator interface 110 is also coupled to an input port 111 of the gaming platform 101 and is controlled by a moderator.

The gaming platform 101 is for example a PC or games console. Alternatively, it could be a server, in which case the display 106 and input device 108 are for example coupled to the gaming platform via a network or the Internet. As a further alternative, the gaming platform 101 could be a mobile device such as a portable games console, mobile telephone or laptop. In this case, the display 106 is for example the display of the mobile device, and the player control input device 108 is for example the keypad of the mobile device. While the player is playing the game, the player controls the actions of the avatar using the player control input device 108, and views the game using the display 106.

The game core 102 for example comprises a software engine for executing the computer game based on the player input, and generating the images displayed to the player during the computer game on display 106.

The avatar profile 104 is for example stored in a memory and is used to store attributes that affect the visual appearance of the avatar in the computer game, and also characteristics of the avatar that affect the avatar's performance in the computer game, such as the difficulty level, skill level, speed, etc.

The moderator interface 110 allows a moderator to access the gaming platform 101, and in particular the avatar profile 104. The moderator interface 110 is for example a PC that a moderator can use to view and modify the avatar attributes. The moderator interface 110 is coupled directly, or via a network such as a wireless LAN and/or the Internet, to the input port 111, which for example comprises a network adaptor, web portal or other type of communications interface. The moderator may modify attributes associated with the avatar in the avatar profile 104 based on variables taken from the player's daily life. The avatar attributes are for example transmitted to the moderator interface 110 to be viewed by the moderator, and in response, a series of data values modifying the avatar attributes is sent via the moderator interface 110 to the avatar profile 104.

Examples of variables in the player's daily life that can be used as a basis for determining modifications to the avatar's attributes include variables relating to the player's health, such as the player's weight, blood pressure, body mass index, body fat percentage, smoking habits, eating habits, drinking habits, heart rate, lung capacity, blood sugar level, etc. Furthermore, a pedometer, accelerometer or camera could be used to test movement and therefore general fitness of a player, or physical or mental tests could be made on the user.

For example, a player can be weighed by the moderator, who then updates the avatar profile 104 in the computer game based on the player's weight. This for example involves changing the appearance of the avatar in the game, to show corresponding weight loss or gain. Alternatively or additionally, this involves changing the performance of the avatar, such as reducing or increasing the avatar's speed, strength or skill in the game.

The moderator who updates the avatar profile in such embodiments is for example a health expert such as a doctor, nurse or dietician. This is preferable, as changes in such variables may be viewed as positive or negative based on the players health history and/or other factors affecting the player. For example, if the variable is the player's weight, and the player is an overweight adult, a weight loss should be considered as positive and a weight gain as negative. However, if the player is a growing child of normal weight or an underweight adult, a weight loss should be considered as negative and an increase in weight should be considered as normal or positive.

As a different example, the variables in a player's life could for example be the time spent working on a project or doing homework. In this case, the moderator could be an independent arbitrator, such as a teacher or the parent of a child player, who judges whether sufficient time doing homework or working on the project has been performed. If so, the attributes in the avatar profile 104 of the avatar associated with the player may be modified to give the avatar more points, increased skill level, etc. Again, the use of an expert as the moderator is preferable, as an expert can judge what other extenuating circumstances exist in the player's life that may affect the time spent working on projects/homework, such as holidays, bad health, or other commitments in the player's life. Furthermore, a teacher is an expert who can judge how long a student of a particular age should be spending doing homework.

In the embodiments described herein, the avatar's appearance and in some cases the avatar's performance are for example altered to reward players who achieve positive lifestyle objectives. On the other hand, for players who perform poorly in achieving lifestyle objectives, the avatar's performance and/or appearance are for example modified negatively. These modifications can thereby motivate players to improve their lifestyle choices.

For example, the avatar of a player who needs to lose weight but who gains weight is made to have an obese appearance and to run slowly, which is both visually unappealing to the player, and also undesirable to the player as the reduced performance of the avatar can negatively affect the ability of the player to complete the game. The player is thus motivated to lose weight. As another example, the avatar of a player who smokes too much is made to look old and to lose health points, to motivate the player to reduce the amount they smoke. As a further example, the avatar of a player who does not spend enough time doing school assignments is modified to respond more slowly to the player's control movements using the control input device, making progression in the game harder. The player is then encouraged to work more on their school assignments to improve the response time of the avatar in the game.

As an alternative, the skin tone of the avatar could be altered to reflect the lifestyle choices of the player. For example, a pale complexion could be applied to the avatar of a player who smokes too many cigarettes, whereas if the player reduces the number of cigarettes smoked, the complexion could change color, for example suggesting a healthy tanned complexion.

As a further alternative, the size that the avatar appears in the game could be selected based on the players lifestyle choices, for example a small size implying that negative choices have been made, whereas larger sizes indicating that positive lifestyle choices have been made.

When an improvement in the lifestyle variables of the player is detected, the appearance and/or performance of the avatar are modified to reward the player and encourage further improvement towards their lifestyle goals.

The avatar profile 104 is for example reloaded each time a player logs into the computer game to play. Modifications to the avatar profile 104 made by the moderator can for example be implemented while a player is playing, in which case the changes can have immediate effect on the avatar's appearance and/or performance, or modifications can be made between gaming sessions, such that the avatar's appearance and/or performance can be seen by the player the next time he/she logs on to play.

In operation, a player for example loads a game into the gaming platform 101, for example by introducing software for running the game, in the form of a DVD or other storage medium, or downloading the game. Alternatively, if the game is hosted by a remote server, the player for example logs into the game via the internet.

When a new game is started, the player is for example given options for selecting visual and/or performance characteristics of an avatar to be assigned to that player during the game. For example, if the avatar is humanoid, the player may be able to select hair, eye and skin tones, build, height etc. from a database of possible appearances.

Once the avatar has been defined by a player, the attributes selected by the player, along with other attributes having an initial value that for example can only be modified during the progression of the game, are loaded into the avatar profile 104.

The player plays the game by controlling the avatar to perform tasks using the control input device 108. The attributes of the avatar stored in the avatar profile 104 are for example modified during the game based on the player's actions.

At any time once the game has started, the avatar profile can also be modified by the moderator via the moderator interface 110. To modify the player appearance, a database containing data corresponding to different avatar appearances is for example provided with the game software, one of these appearances may be indicated in the avatar profile 104 as determined by the moderator.

The database of different avatar appearances for example comprises a plurality of physiques of the avatars and/or a plurality of skin tones for the avatars and/or a plurality of sizes for the avatars.

In some embodiments of the game, a Feedback Activated Option may be selected, and when not activated, no feedback from a moderator to update the attributes is provided. On the other hand, when the Feedback Activated Option is selected, the game runs until it reaches a time out established by the moderator.

For example, the game could be given to a player by their heath expert or dietician during a visit, and the health expert or dietician could set a time out to occur around the time of the next scheduled visit. During the next visit, tests are made on the player, and the expert updates the avatar parameters accordingly.

Alternatively, the game could be given to a player by a teacher, and the teacher could set the time outs at times of exams, and based on exam results, the teacher could update the avatar profile.

FIG. 2 illustrates a gaming system 200 comprising a gaming platform 201, an avatar A profile 204 and an avatar B profile 205. Coupled to the gaming platform 201 is a display 206 coupled via an output port 207 of the gaming platform, a player A control input device 208A coupled via an input port 209A of the gaming platform, a player B control input device 208B coupled via an input port 209B of the gaming platform and a moderator interface 210 coupled via an input port 211 of the gaming platform. A player A sensor 212A and a player B sensor 212B are also coupled to the gaming platform 201 via input ports 213A and 213B respectively of the gaming platform. A player A sensor memory 214 and a player B sensor memory 215, which may be provided as parts of a same memory device, are provided for storing data sensed by sensors 212A and 212B respectively.

The gaming system 200 allows two players to play using the same gaming platform 201. The avatar A profile 204 stores attributes relating to the avatar of player A, which are for example the same attributes as described above in relation to avatar profile 104, and likewise for avatar B profile 205, which stores attributes relating to player B.

As with the gaming system 100, the gaming platform 201 of gaming system 200 is for example a PC or games console, a server, or a mobile device such as a portable games console, mobile telephone or laptop. Players A and B for example share a same display 206, or a separate display could be provided for each player. As with moderator interface 110, the moderator interface 210 is for example a PC that a moderator can use to view and modify the avatar attributes. The moderator interface 210 is coupled directly, or via a network such as a wireless LAN and/or the Internet, to the input port 211, which for example comprises a network adaptor, web portal or other type of communications interface.

In the gaming system 200, player sensors 212A and 212B provide sensor data relating to the players' lifestyle. For example, the sensors 212A and 213B may comprise one or more of: weighing scales, accelerometers, pedometers, smoke sensors, microphones and digital cameras. Other possibilities include sensors for determining the blood pressure of the players, sensors for determining the body fat percentage of the players, blood sugar testers or other types of blood testers, breath test gauges for detecting lung capacity, humidity sensors and pressure sensors. Such sensors could also comprise a timer, such that a player can time how long they spend doing homework or working on a project.

The data sensed by sensors 212A and 212B is stored in memories 214 and 215, and is accessible via the moderator interface 210. For example, the sensed data, along with the modifiable avatar attributes for each player are transmitted together or individually to the moderator interface 210, and in response, modified avatar attributes are transmitted to the avatar profiles 204 and 205. In some embodiments, the moderator interface 210 is for example programmed by the moderator such that for certain sensed data ranges for a particular player, the avatar attributes are modified accordingly. In this case, the response can be generated automatically by the moderator interface 210. Alternatively, the response by the moderator interface 210 is semi-automatic, meaning that some attribute are automatically modified based on the sensed data while others are modified by the moderator, or entirely manual, the moderator entering all modifications.

The gaming platform 200 could be extended to support more than two players, for example three, four, five or more players. In particular, an additional avatar profile, control input and sensor input can be provided for each additional player. Alternatively, one or more sensors may be shared by the players. For example, if the sensor is a weight sensor or body fat percentage sensor, the players can use this sensor in turn.

Operation of the gaming system 200 of FIG. 2 is for example very similar to that of the gaming system 100 of FIG. 1 described above, except that the sensors 212A and 212B provide data allowing the moderator to modify the avatar attributes with or without meeting the player in person.

Depending on the types of sensors, the sensors may need passive or active input from the players. For example, sensors such as smoke sensors, microphones, or cameras could be activated to sense data without needing actions of the players. Other types of sensors, such as heart monitors or blood testers may need the players to perform actions to provide inputs to the sensors.

For some sensor types, such as weighing sensors, or heart monitors, the players could be requested to use the sensors each time the player starts a game, and the sensed data could be recorded, for example along with a time stamp such that the moderator knows the time and date that the data is collected.

Alternatively or additionally, the players could be requested to use the sensors at regular intervals during the game, for example each hour, or in order for the player to progress from one level in the game to another. Such regular intervals could be preset by the moderator. For example, if the sensor is a blood sugar level sensor, the health adviser of the player could preset blood sugar tests to be made based on the needs of the player, for example every 2 hours. The gaming platform 201 could be arranged to provide an alarm to indicate that the test should be made even when the game is not being played. In some embodiments, if a player does not respect the request to perform the test, the game could be deactivated.

Some sensors are arranged to capture data all of the time, or at certain times, without intervention of the player. As an example, a microphone is arranged to detect noise all of the time while child players are playing, and if noise levels climb too high, a moderator could program the avatar attributes to change the avatar attributes so that the players are made aware they are making too much noise.

An advantage of a multiplayer gaming platform 201 is that changes to the avatar appearance may be not only seen by the player associated with the avatar, but also by the other players, leading to additional motivation for the players to improve the visual appearance of their avatar in the game.

FIG. 3A illustrates a gaming system 300 comprising a gaming platform A 302, a gaming platform B 304 and a gaming platform C 306. The gaming platforms are interconnected by a communications network 308, such as a wireless LAN (local area network) and/or the Internet. Each of the gaming platforms 302 to 306 is for example the gaming platform 101 or 201 described above, comprising a communications interface (not shown in FIGS. 1 and 2) for communicating via communications network 308. In this embodiment a multiplayer game can be created by interconnecting the gaming platforms. A moderator interface for each gaming platform could be provided, connected directly to each platform, or could be connected elsewhere to network 308 via a separate interface.

FIG. 3B illustrates a system 310 according to an alternative embodiment in which a gaming platform 312 is implemented in the form of a server. The gaming platform 312 is for example the gaming platform 101 of FIG. 1 or platform 201 of FIG. 2, and in this case, a player A 314, a player B 316 and a player C 318 may enter the game by communicating with the gaming platform 312 via a communications network 320, which is for example provided by a wireless LAN and/or the Internet 320. Each player is for example equipped with a PC having a communications interface for communicating via network 320, a display for displaying the game, and a control input device. In this embodiment, one or more moderator interfaces are coupled directly to the gaming platform 312 or coupled via the communications network 320.

The computer game described herein can for example be stored on a digital storage medium such as a CD or DVD, and when loaded into a games console, PC, server or the like, corresponding to the gaming platform described herein, the operation as described above is implemented.

An advantage of embodiments of the gaming system and method described herein is that by providing a moderator interface 110, 210 and an avatar profile 104, 204, 205 that can be modified via the moderator interface, the progression of the game in terms of avatar appearance and/or avatar performance can be controlled such that the game more closely follows the lifestyle of the players. Furthermore, a combination of one or more input sensors 212, 213, a memory 214, 215 for storing sensor data and a moderator interface, allows a moderator to review data captured by the sensor and make appropriate modifications to the avatar profile.

A further advantage of embodiments of the gaming platforms described herein is that by providing a gaming platform that adjusts the visual appearance and/or performance of the avatar in the game based on the avatar profile, feedback is provided to the player on how the moderator has modified the avatar attributes via the moderator interface. Thus the player is able to identify the affects of his/her lifestyle habits on the progression in the game, for example for a change in appearance of their avatar.

An advantage of the multiplayer embodiments of FIGS. 2, 3A and 3B is that by providing one or more moderator interfaces, the avatar profile associated with each player can be modified, and thus competition can be encouraged between the players.

Multiplayer embodiments are also advantageous as modifications to the visual appearance of the avatar of one player can be seen by other players in the game, providing more motivation for the player to improve their lifestyle choices.

An advantage of providing the gaming platform 101 or 201 as part of a mobile device, such as a mobile telephone or portable games console, is that such devices may be carried with a player wherever they go. Furthermore, such devices are often equipped with sensors that can be used in the game, such as microphones, still or video cameras, accelerometers, position sensors etc., and include an interface that can be used for communications with a moderator, for example via a communications interface provided in the device.

While a number of specific embodiments have been described, it will be apparent to those skilled in the art that various alternatives and modifications may be applied.

For example, the moderator interfaces and player input controls and display may be arranged differently with respect to the gaming platform.

The gaming platforms described herein can be used to support any type of game, which may involve humanoid characters, or other types of avatars, such as racing cars, alien creatures etc.

The gaming platforms described herein could support games to be played in one session, or games played in multiple sessions. Certain lifestyle habits of the player, such as the player's weight or body fat percentage, are better suited to computer games played over a relatively long period of time, for example weeks or months. Other lifestyle habits, such as the number of cigarettes smoked or alcohol consumed may be better suited to shorter games lasting a few hours or days.

As described above, while a moderator is used to oversee modifications to the avatar attributes in the computer game, values provided by the moderator interface that modify the avatar attributes in the profile may be generated automatically based on criteria set by the moderator, generated semi-automatically, or generated by the moderator directly.

It will be apparent to those skilled in the art that features or any of the embodiments described herein may be combined with any of the other embodiments. For example, the platform 101 of FIG. 1 could be made to be multiplayer, and/or comprise a sensor and sensor memory as described in relation to FIG. 2.

The invention claimed:

1. A device comprising:
a memory to store instructions; and
a processor to execute the instructions to:
   receive an input, from a user device, for controlling an avatar to perform tasks during progression of the avatar in a game;
   provide one or more avatar attributes to a moderator device;
   receive a command from the moderator device to modify at least one of the one or more avatar attributes,
      the command being manually entered at the moderator device,
      the command being based on an analysis of one or more attributes associated with a health of a user of the user device, and
      at least one of the one or more avatar attributes not being modified when at least one of the one or more attributes associated with the health of the user indicates that a corresponding avatar attribute should be modified;
   modify, based on the command, at least one of the one or more avatar attributes to create a modified avatar; and
   replace the avatar with the modified avatar in the game.

2. The device of claim 1, where the processor is further to:
provide, for display, the modified avatar in the game.

3. The device of claim 1, where the processor is further to:
receive sensor data associated with the user,
   the one or more attributes associated with the health of the user being based on the sensor data; and
provide the received sensor data to the memory for storage.

4. The device of claim 3, where the processor is further to:
provide the received sensor data to the moderator device.

5. The device of claim 1, where the one or more attributes associated with the health of the user are associated with an appearance of the avatar in the game.

6. The device of claim 1, where the one or more avatar attributes are associated with at least one of:
a physique of the avatar,
a skin tone of the avatar, or
a size of the avatar.

7. The device of claim 1, where the processor is included in a gaming console.

8. The device of claim 1, where the user device is part of a gaming console and the processor is located remotely from the user device.

9. The device of claim 1, where the device is a mobile device.

10. The device of claim 1, where
the processor receives the manually entered command from a health expert.

11. The device of claim 1, where
the game includes a plurality of avatars, and the processor is further to:
   receive a command from the moderator device to modify at least one avatar attribute for more than one of the plurality of avatars; and
   modify, based on the received command, at least one avatar attribute for each of the more than one of the plurality of avatars to create a respective modified avatar for each of the more than one of the plurality of avatars.

12. A method comprising:
receiving, by a device, an input, from a user device, for controlling an avatar to perform tasks during progression of the avatar in a game;
providing, by the device, one or more avatar attributes to a moderator device;
receiving, by the device, a command from the moderator device to modify at least one of the one or more avatar attributes,
   the command being manually entered at the moderator device,
   the command being based on an analysis of one or more attributes associated with a health of a user of the user device, and
   at least one of the one or more avatar attributes not being modified when at least one of the one or more attributes associated with the health of the user indicates that a corresponding avatar attribute should be modified;
modifying, by the device, at least one of the one or more avatar attributes to create a modified avatar; and
replacing, by the device, the avatar with the modified avatar in the game.

13. The method of claim 12, where
the manually entered command is received from a health expert.

14. The method of claim 13, where the one or more attributes associated with the health of the user include at least one of:
a weight of the user,
a blood pressure of the user,
a blood sugar level of the user,
a heart rate of the user,
a lung capacity of the user, or
a muscle/fat ratio of the user.

15. The method of claim 13, further comprising:
receiving sensor data associated with the user,
   the one or more attributes associated with the health of the user being based on the sensor data; and
providing the received sensor data to the moderator device.

16. The method of claim 12, where
the game includes a plurality of avatars, and the method further comprises:

receiving a command from the moderator device to modify at least one avatar attribute for more than one of the plurality of avatars; and modifying, based on the received command, at least one avatar attribute for each of the more than one of the plurality of avatars to create a respective modified avatar for each of the more than one of the plurality of avatars.

17. The method of claim 12, where the one or more attributes associated with the health of the user are associated with a visual appearance of the avatar in the game.

18. The method of claim 12, where, when modifying at least one of the one or more avatar attributes to create a modified avatar, the method further includes:

modifying a speed of the avatar in the game.

19. A non-transitory storage medium storing instructions, the instructions comprising:

one or more instructions which, when executed by at least one processor, cause the at least one processor to:

initiate a gaming session;

receive an input, from a user device, for controlling an avatar to perform tasks during progression of the avatar in the gaming session;

provide, during the gaming session, one or more avatar attributes to a moderator device;

receive, during the gaming session, a command from the moderator device to modify at least one of the one or more avatar attributes, the command being manually entered at the moderator device, the command being based on an analysis of one or more attributes associated with a health of a user of the user device, and at least one of the one or more avatar attributes not being modified when at least one of the one or more attributes associated with the health of the user indicates that a corresponding avatar attribute should be modified;

modify, based on the command and during the gaming session, at least one of the one or more avatar attributes to create a modified avatar; and replace, during the gaming session, the avatar with the modified avatar.

20. The non-transitory storage medium of claim 19, where the instructions further include:

one or more instructions to provide, for display, the modified avatar in the game.

21. The non-transitory storage medium of claim 19, where the instructions further include:

one or more instructions to receive sensor data associated with the user, the one or more attributes associated with the health of the user being based on the sensor data;

one or more instructions to provide the received sensor data to the moderator device.

22. The non-transitory storage medium of claim 19, where the game includes a plurality of avatars, and the instructions further include:

one or more instructions to receive a command from the moderator device to modify at least one avatar attribute for more than one of the plurality of avatars; and one or more instructions to modify, based on the received command, at least one avatar attribute for each of the more than one of the plurality of avatars to create a respective modified avatar for each of the more than one of the plurality of avatars.

\* \* \* \* \*